United States Patent
Jang et al.

[11] Patent Number: 5,912,833
[45] Date of Patent: *Jun. 15, 1999

[54] CARRY INCREMENT ADDER USING CLOCK PHASE

[75] Inventors: Hyun Sik Jang; Dong Seuk Park, both of Kyoungkido, Rep. of Korea

[73] Assignee: Hyundai Electronics Industries Co., Ltd., Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/668,363

[22] Filed: Jun. 26, 1996

[30] Foreign Application Priority Data

Jun. 28, 1995 [KR] Rep. of Korea ................ 1995-17888

[51] Int. Cl.$^6$ ...................................... G06F 7/50
[52] U.S. Cl. ................. 364/787.02; 364/787.03
[58] Field of Search ............... 364/787.02, 787.03, 364/787.01, 787.04

[56] References Cited

U.S. PATENT DOCUMENTS

| | | | |
|---|---|---|---|
| 4,683,548 | 7/1987 | Mlynek | 364/786 |
| 4,761,760 | 8/1988 | Tomoji | 364/787.02 |
| 4,942,549 | 7/1990 | Jutand et al. | 364/787.02 |
| 5,097,436 | 3/1992 | Zurawski | 364/787.02 |
| 5,144,575 | 9/1992 | Jeong et al. | 364/748 |
| 5,257,218 | 10/1993 | Poon | 364/787 |
| 5,394,352 | 2/1995 | Nakano | 364/787.03 |

*Primary Examiner*—David H. Malzahn
*Attorney, Agent, or Firm*—Blakely Sokoloff Taylor & Zafman

[57] ABSTRACT

A carry increment adder (CIA) using a clock phase in which the CIA performs at an increased speed but uses a much smaller chip area than a general fast adder structure. In the CIA from 1 to N partial adder modules (RCA) which generate partial sum and partial carry value using desired bits of two input data (a, b) as a module. The wider the addition bits width, the greater the speed and the smaller the chip area used.

8 Claims, 5 Drawing Sheets

5,912,833

CARRY INCREMENT ADDER USING CLOCK PHASE

BACKGROUND OF THE INVENTION

This invention relates to a Carry Increment Adder (CIA) which applies to accumulators used in a Digital Signal Processor (DSP) or microprocessor. More particularly, this invention relates to a CIA using a clock phase in which the CIA is fast and is achieved by using a much smaller chip area than a general fast adder structure.

Generally, adders are used in digital systems such as a DSP or microprocessor. Additionally, adders are important in determining performance of a computer or a computer program.

Accordingly, adders have been structurally researched due to their long term importance. A Ripple Carry Adder (RCA), a simple adder structure, is well known in the art. The RCA has one of the lowest speeds. This is due, in part to the bit width of addend which increases due to the decrement of speed resulting from the delay of the carry ripple. This causes the increments in linear delay to occur.

To overcome the problems of RCAs, many adder structures such as Carry Lookahead Adder (CLA), Carry Skip Adder (CSA), and Carry Select Adder (CSA) have been devised and used in practice. However, most adders have trade-off characteristics of speed and chip area according to their structures. To illustrate, most high speed adders generally require a large chip area. In the case of a RCA, an adder that has the lowest speed, the least chip area is required. Accordingly, one has to select the proper adder structures in the systems which need them by balancing the desired speed against the amount of chip area needed.

FIG. 1 shows a block view of an 8-bit CIA, divided by first and second modules. Each module has the desired bits to record the partial sum and partial carry. The first module comprises a lower 4-bit RCA (11) which outputs lower 4-bit sum values (S3–S0) of a and b inputs (each has 8 bits) and a carry value which occurs during the summation. The second module comprises a higher 4-bit RCA (12) which outputs higher 4 bit sum values (In3 through In0) of a and b inputs, and conditional increment (13) which output sum values (S7 through S4) of output value (In3–In0) of the higher 4-bit RCA (12) and carry value (C1).

In the operation of the CIA, at first, a and b inputs of 8 bits are added through two 4-bit RCAs (11, 12). That is, each of the higher 4 bits and lower 4 bits of a and b inputs are added in parallel. At this moment, carry input (C1) is assumed to be 0. After the higher 4 bits and lower 4 bits of a and b inputs are added simultaneously, the conditional increment (13) increases the values (In3–In0) calculated in the higher 4-bit RCA (12) by 1 when the carry occurs in the lower 4-bit RCA (11). The values calculated in the higher 4-bit RCA (12) are output when no carry occurs.

However, the area of the conditional increment should be considered in the carry increment adder, and it becomes a serious problem especially when this technology applies to the semiconductor devices requiring large scale integration.

SUMMARY OF THE INVENTION

It is the object of this invention is to provide a carry increment adder which is fast and uses a smaller chip area of a clock phase by the repeated calculation of the conditional increment using a clock phase by way of a higher module adder instead of a special circuit block.

To achieve this goal, the carry increment adder comprises higher and lower partial adder modules that add two input data in parallel after dividing the above two input data to higher and lower partial bits, and generate partial sum signal and carry signal respectively; and, a control means that causes the higher partial adder module to receive the carry signal of the lower partial adder module under the control of the phase of the clock signal input from the outside so that the higher partial adder module can output the sum of the higher partial bits plus the carry value.

Additionally, the carry increment adder of this invention comprises N (1, 2, . . . N) partial adder modules which generate partial sum and partial carry after adding desired partial bits of two input data to be added in parallel. A N-1 partial add result detector [which] outputs partial add result detection signals after determining if all the bits of partial the sum output from N-1 higher partial adder modules except the lowest partial adder module which adds the lowest partial bits among the partial adder modules, are '1'; an increment signal generator which outputs increment signal after receiving carry of the lowest partial adder module and carries output from each module of N-1 higher partial adder modules and the partial add result detection signal; and, a controller which causes the higher partial adder module to receive the increment signal under the control of the phase of the clock signal input from the outside and causes the higher partial adder module to output the value of the partial sum and a carry value.

The invention uses a carry increment addition algorithm described above and decreases the chip area occupied to the extent that the adder needs it in 4-bit RCA, by repeating the conditional increment module function executed in the conditional increment (13) in the higher 4-bit RCA (12).

Because the function of conditional increment module is to add 1 to the input value, the adder module can be used again. Therefore, a structure is needed that adds the initial a and b input data in the lower 4-bit RCA and increases the resultant value by 1 in the higher 4-bit RCA.

In order to operate the higher module RCA twice, the RCA carries out a normal operation of RCA in the high phase of clock, and '1' increment function in the low phase, using the main clock (CLK) for sequence control in the synchronous system in accordance with the invention.

BRIEF DESCRIPTION OF THE DRAWINGS

Embodiments of the invention will now be described by way of example, with reference to the accompanying drawings, in which.

DETAILED DESCRIPTION OF THE INVENTION

Figure 2:
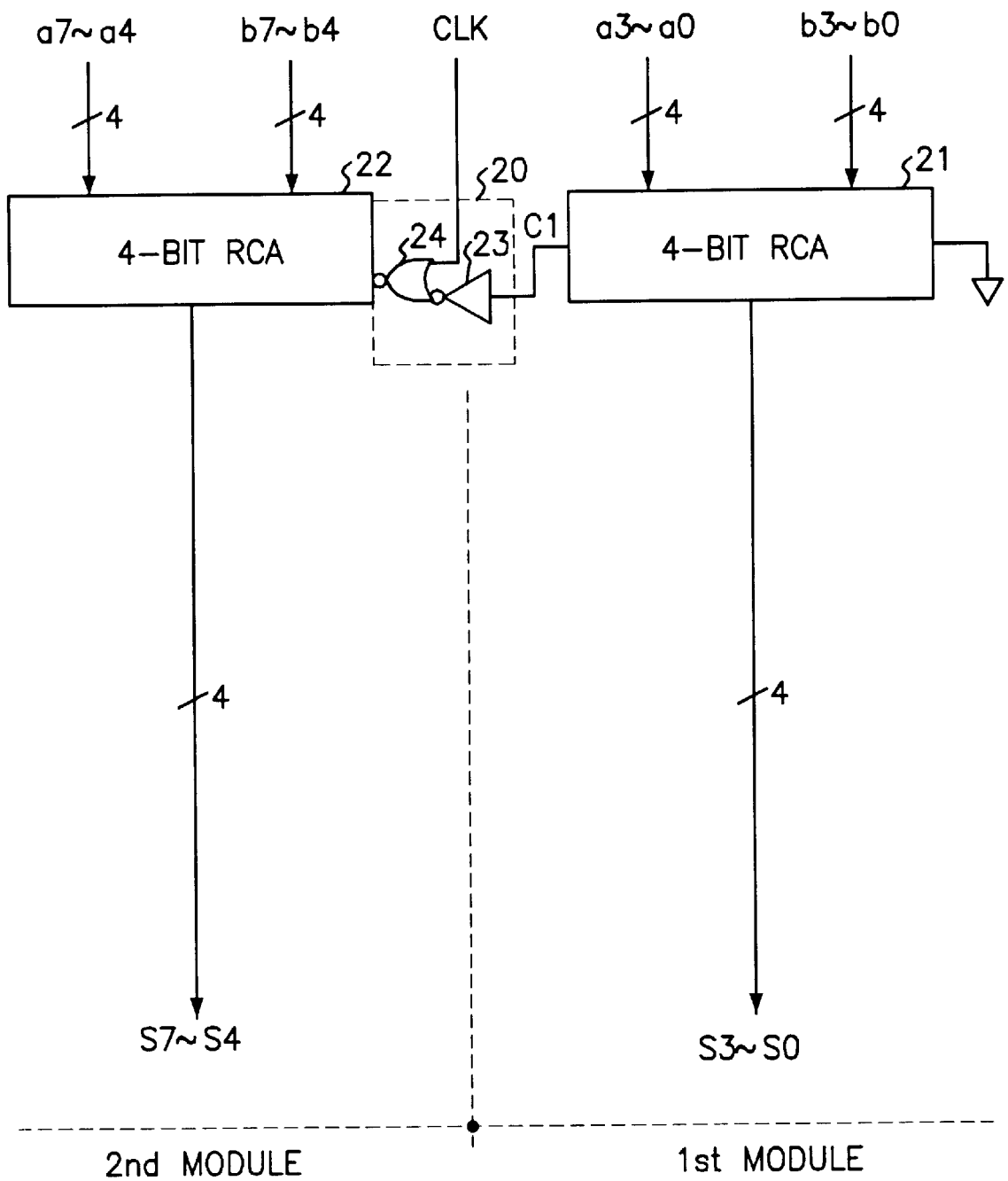
FIG. 2 shows a block view of a general 8-bit carry increment adder according to the present invention.

FIG. 2 shows a block view of an 8-bit carry increment adder according to the present invention including a controller (20) and two 4-bit RCAs (21, 22). In the present invention, an 8-bit CIA can be divided by a first lower 4-bit RCA (21) and a second higher 4-bit RCA (22). Each RCA has 4 bits of input as represented by (a, b). The controller (20) carries out the same operation as normal RCA in the 'high' phase of clock, and '1' increment function in the 'low' phase of clock. The controller consists of an inverter (21) which inverts a carry output value of the lower 4-bit RCA (21), and a NOR gate (24) which NORs the output value of the inverter and the main clock input from the outside and outputs the result to the higher 4-bit RCA (22).

Figure 1:
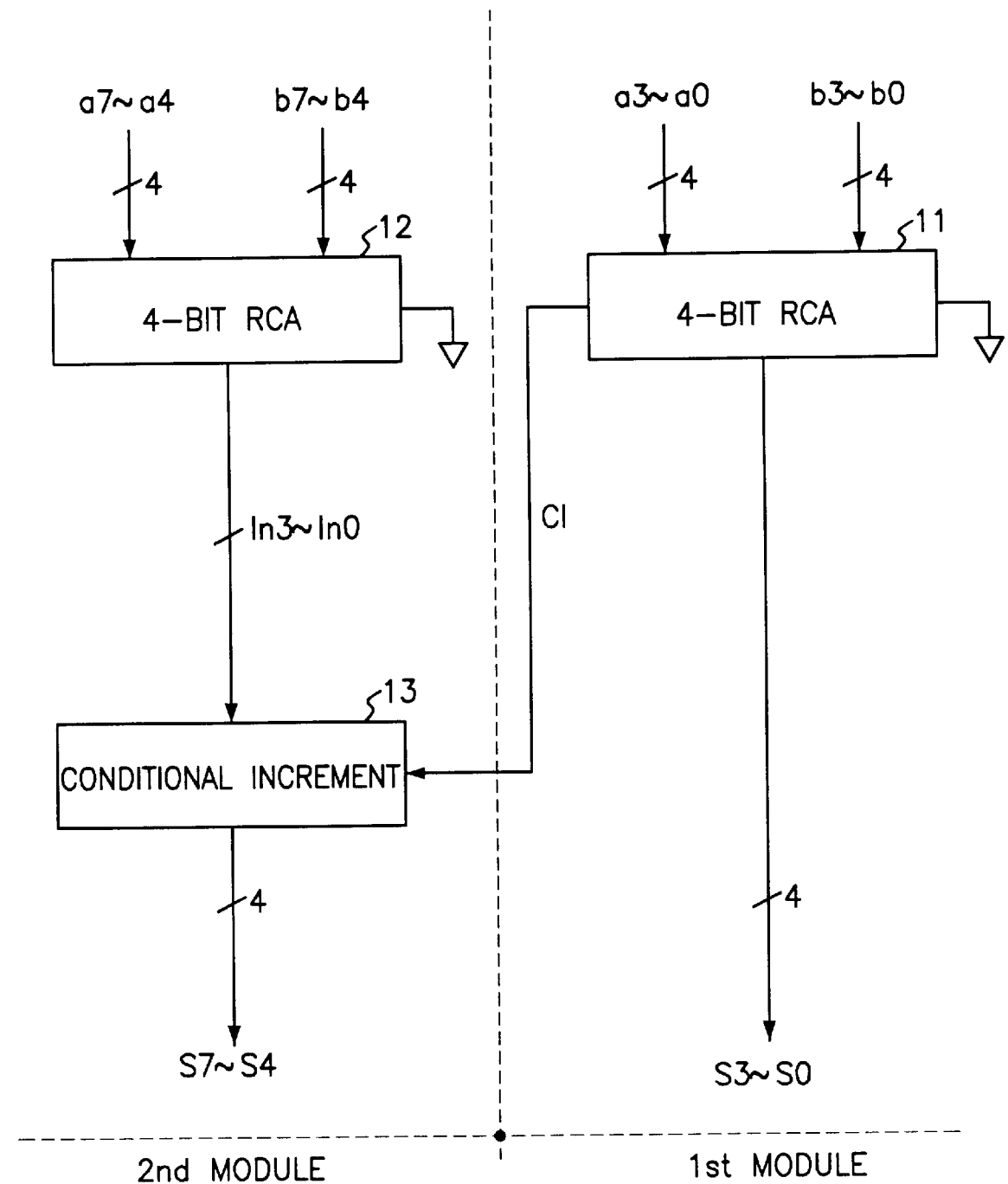
FIG. 1 shows a block view of a general 8-bit CIA.

At the beginning of the operation of an 8-bit CIA, the main clock is 'high', the carry values in the two modules are assumed to be 0 as in the normal CIA of FIG. 1 allowing the addition operation to be carried out in parallel.

When the main clock becomes 'low', the second module (22) carries out an addition operation as a carry input of 1 wherein the carry output value (C1) of the first module is 1, and the resultant value calculated in the main clock of 'high' remains in the case that the carry output value of the first module is 0. Therefore, the second module implements a conditional increment.

The 8-bit CIA has a lower speed relative to the RCA; however, the speed can be increased if the module addition width decreases. That is, when a 2-bit RCA is used as each module adder, the speed can be increased and the chip area occupied is almost the same as that of an RCA.

The case involving the utilization of two or more multi adder modules will be described in FIGS. 3 through 5.

Figure 3:
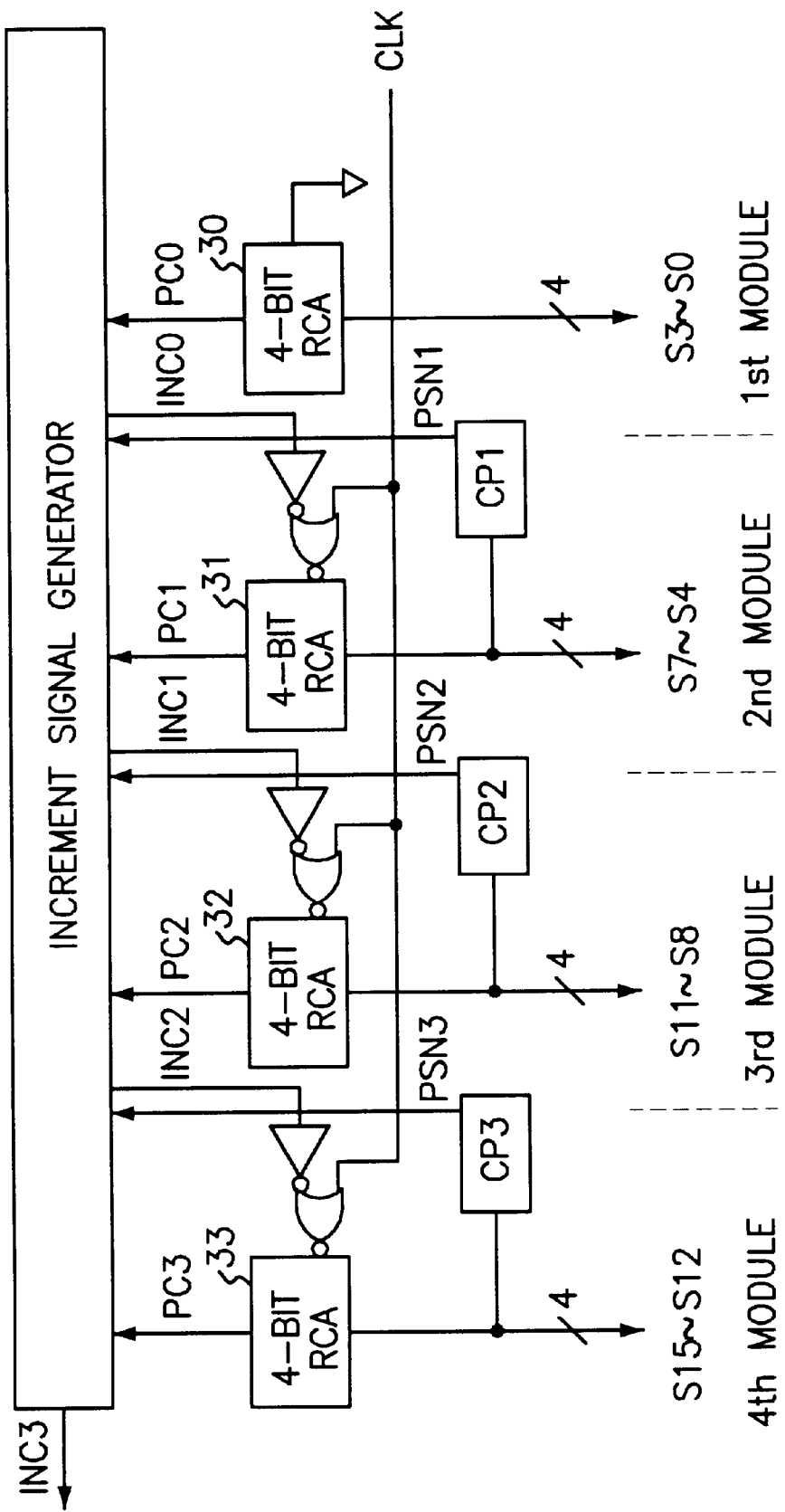
FIG. 3 shows a block view of a 16-bit carry increment adder according to the present invention.

FIG. 3 shows the block view of a 16-bit CIA according to the present invention. As shown in the drawing, the 16-bit CIA is divided by two or more adder modules and requires a total of 4 adder modules (first, second, third, and fourth modules) when input of each adder module is assumed to have 4 bits.

Each adder module has a 4-bit RCA (30, 31, 32, 33) which outputs the sum of partial 4-bits of a and b inputs and carry values (PC0/PC1/PC2/PC3) that is a result of the summation. Partial add result detectors (CP1 to CP3) are connected to second through fourth modules that determine if all the outputs of the 4-bit RCA (31–33) are '1' and output the determination values (PSN1, PSN2, PSN3).

The increment signal generator receives carry values (PC0, PC1, PC2, PC3) and determination values (PSN1, PSN2, PSN3) output from each module and outputs carry increment signals (INC0, INC1, INC2, INC3) which determine if each module has a carry increment or not.

Each 4-bit RCA (31 to 33) of the second module to the fourth module receives carry which occurs at the NOR gates after receiving the inverted values of the increment signals (INC0, INC1, INC2, INC3) and the clock signal (CLK), and outputs the final output values (S3–S0/S7–S4/S11–S8/S15–S12).

Figure 4:
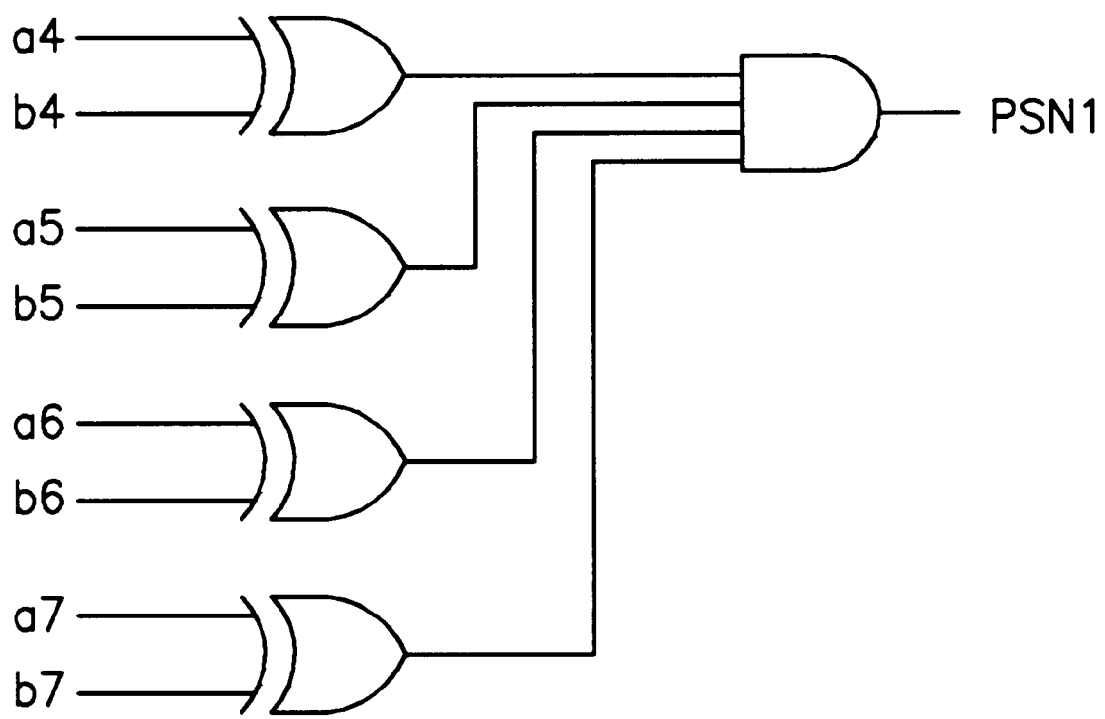
FIG. 4 shows a logic circuit view of a partial add result detector according to FIG. 3.

FIG. 4 shows the logic circuit of partial add result detector according to FIG. 3. Describing it in the example of the second module, the logic circuit comprises four exclusive OR gates in which each OR gate receives one bit (a4, b4/a5, b5, a6, b6/a7, b7) from a and b inputs, and an AND gate which receives the outputs of the four exclusive OR gates and outputs the determination value (PSN1).

Figure 5:
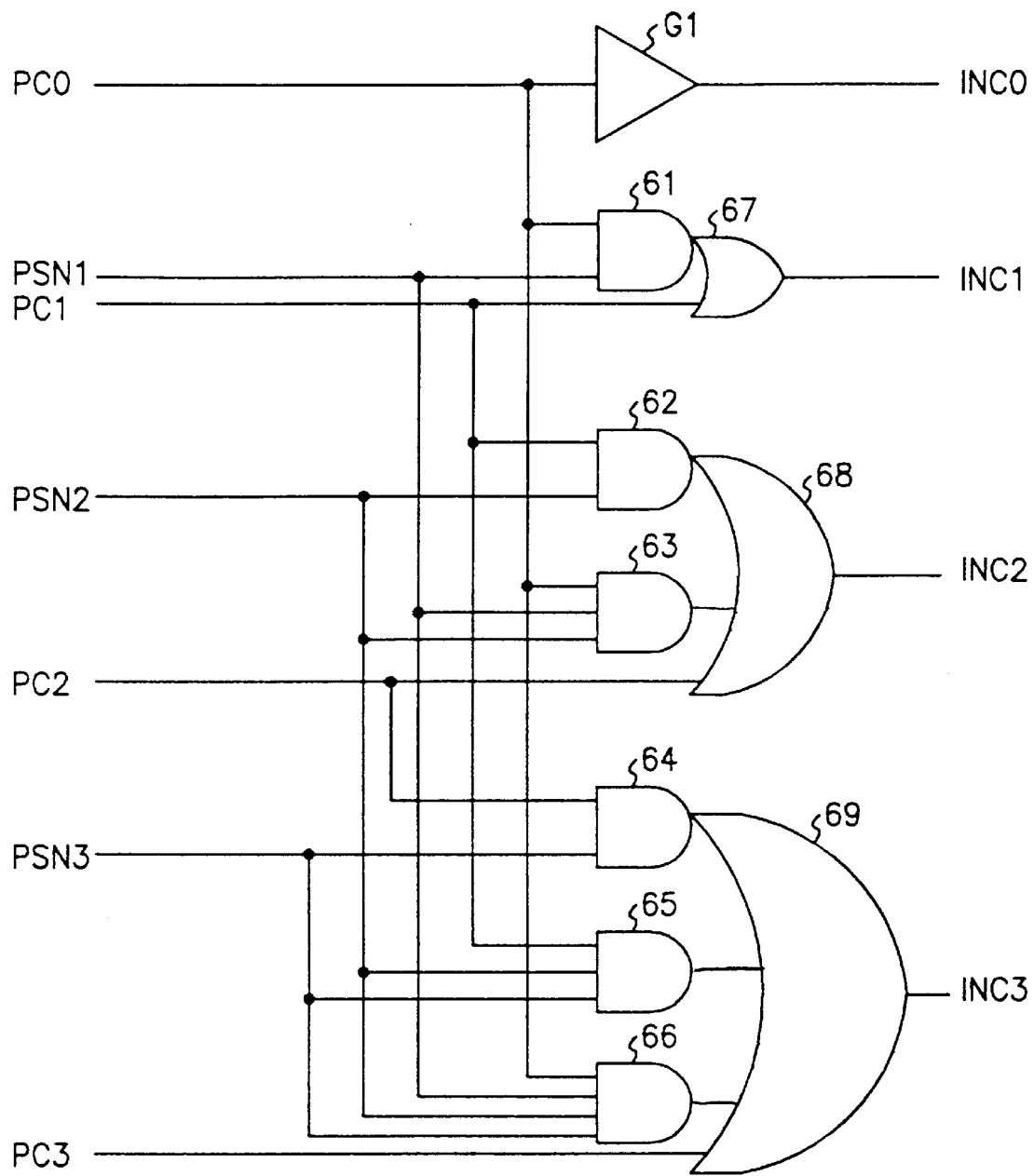
FIG. 5 shows a logic circuit view of an increment signal generator according to FIG. 3.

FIG. 5 shows the logic circuit of increment signal generator according to FIG. 3. The increment signal generator comprises buffer (G1) which receives carry value (PC0) output from 4-bit RCA (30) of the first module and outputs increment signal (INC0); a first AND gate which receives determination value (PSN1) output from the partial add result detector (CP1) of the second module and the carry value (PC0) output from the first module; a first OR gate which adds logically the output of the first AND gate and the carry value (PC1) output from the 4-bit RCA of [2nd] the second module and outputs increment signal (INC1); a second AND gate which receives carry value (PC1) output from the second module and the determination value (PSN2) output from the partial add result detector (CP2) of third module; a third AND gate which receives carry value (PC0) output from the first module, the determination value (PSN1) output from the partial add result detector (CP1) of the second module and the determination value (PSN2) output from the partial add result detector (CP2) of the third module; a second OR gate which adds logically carry value (PC2) output from 4-bit RCA of the third module and the outputs of second and third AND gates and outputs increment signal (INC2); a fourth AND gate which receives carry value (PC2) output from the third module and determination value (PSN3) output from the partial add result detector (CP3) of the fourth module; a fifth AND gate which receives carry value (PC1) output from the second module, determination value (PSN2) output from partial add result detector (CP2) of the third module and detection value (PSN3) output from the partial add detector (CP3) of the fourth module; a sixth AND gate which receives carry value (PC0) output from the first module, the determination value (PSN1) output from the partial add result detector (CP1) of the second module, the determination value (PSN2) output from the partial add result detector (CP2) of the third module and determination value (PSN3) output from the partial add result detector (CP3) of the fourth module; and a third OR gate which adds logically carry value (PC3) output 4-bit RCA of the fourth module and the outputs of the fourth through the sixth AND gates and outputs the increment signal (INC3).

That is, when N increment signals are needed in the N modules the increment signal generator can be constructed as follows:

$$INC0 = PC0$$

$$INC1 = PC1 + (PSN1 \cdot PC0)$$

$$INC2 = PC2 + (PSN2 \cdot PC1) + (PSN2 \cdot PSN1 \cdot PC0)$$

$$\vdots$$

$$INC(N) = PC(N) + \{PSN(N) \cdot PC(N-1)\} \cdots + \{PSN(N-1) \cdot PSN(N-2) \ldots PC(N-N)\} |$$

On reviewing the operation of 16-bit CIA constructed as above, the second module can be determined if there is any increment or not using carry value (PC0) of the first module only. However, in the third module and higher modules, it is not possible to determine if there is any increment or not using the carry of the preceding stage only. In the case of the third module, the increment occurs if the carry of the second module is 1. But sometimes the increment should occurs in the third module even through the carry of the second module is 0.

When the input carry is 0 and all the partial sum bits of the second module have 1 and carry occurs in the first module, the third module should also carry out the increment operation. Then whether all the partial sum values of the second module are 1 can be determined by the partial add result detector (CP) logic such as that shown in FIG. 4. That is, all the bits of partial sum become 1 if the 4-bit RCA adds data which have complementary bit values of a and b. For example, bi is 1 if ai is 0 and bi is 0 if ai is 1.

The fourth module carries out module increment in the following three cases, that is, (1) when the carry of the third module occurs, (2) when all the bits of the partial sum of the third module are 1, and (3) when carry of the second module is 1 even though the third module does not occur carry, on all the bits of partial sum of the third and the second modules are 1 and carry (PC0) of the first module is 1. Carry (INC3) of total 16-bit CIA can also be determined in the same procedures. Therefore, whether each 4-bit RCA increase or not is determined almost simultaneously in the increment signal generator such as shown in the FIG. 5.

The increment signals (INC0–INC3) generated almost simultaneously operate as carry inputs to each 4-bit RCA when the main clock (CLK) is in low phase. As a result, the same effects can be obtained as the conditional increment operations are carried out in the low phase of the main clock (CLK) in each 4-bit RCA.

Each 4-bit RCA carries out parallel addition operation equally when carrying is 0 in the high phase of main clock (CLK). Then the partial add result detector (CP1 to CP3) uses logic such as that shown in FIG. 4, it does not affect the critical path of 4-bit RCA operation because they operate in the same way as a 4-bit RCA and have a higher speed than that of 4-bit RCA.

Also, because exclusive OR functions are also used in the other adders such as RCA or a CLA as an adder module, the implementation of the partial add result detector (CP) logic per actual module can be carried out with only one 4 input AND gate.

After the 4-bit RCA performs addition in parallel carries out addition, the partial carries (PC0–PC3) generated in each 4-bit RCA generate increment signals through increment signal generator (ISG). When a main clock (CLK) is in the 'low' phase, 1 increment operation is carried out in the corresponding 4-bit RCA in accordance with the values of the increment signals (INC0–INC3).

For our reference, the 'high' phase main clock (CLK) becomes the worst delay case. Delta (Δ) of critical delay here is 4-bit RCA delay+increment signal generator delay. The maximum operating frequency becomes ½*Δ when the duty of operating frequency is 50. For example, the maximum operating frequency becomes 100 MHz when the delta (Δ) is 5 nsec.

The present invention can be achieved in a very small chip area relative to the other high-speed adders because only about 16 gates are added in the 16-bit RCA. When the addition bit width is wider, the speed of the accumulator is increased and the chip area is decreased. Thus, the present invention may be used in the accumulator of the ALO and the DSP fields of microprocessor.

Although particular embodiments of the invention have been described in detail, it should be appreciated that numerous modifications, variations and adaptations may be made without departing from the scope of the invention as defined in the claims.

What is claimed is:

1. A carry increment adder, comprising:
a higher partial adder module and a lower partial adder module which add in parallel two input data (a, b);
said higher partial adder module generates a first partial sum signal which represents a first sum of higher partial bits contained in the two input data (a,b);
said lower partial adder module generates a second partial sum signal and a carry signal, wherein the second partial sum denotes a sum of lower partial bits contained in the two input data (a,b) and the carry signal represents a carry value; and
a controller which causes the higher partial adder module to receive the carry signal of the lower partial adder module under the control of a phase of a clock signal input from the outside so that the higher partial adder module can output the first sum plus the carry value;
said controller further comprising:
an inverter inverting the carry value; and
a NOR gate which has the clock signal and the inverter output signal as two inputs and outputs its NORed signal to the higher partial adder module.

2. The carry increment adder according to claim 1 wherein the clock signal is a main clock signal used for sequence control in a synchronous system.

3. The carry increment adder according to claim 1 wherein,
the higher partial adder module is a ripple carry adder module; and
the lower partial adder module is a ripple carry adder module.

4. A carry increment adder comprising:
N partial adder modules which generate a partial sum and a partial carry after adding in parallel desired partial bits of two input data (a, b), wherein the N partial adder modules includes a highest partial adder module, N-2 partial adder modules and a lowest partial adder module;

N-1 partial add result detectors which output partial add result detection signals after determining if all the bits of partial sum outputs from the highest and N-2 partial adder modules are 1;

an increment signal generator which outputs increment signal after receiving carry of the lowest partial adder module, carries from each of the highest and N-2 partial adder modules and a partial add result detection signals;

a controller which causes a highest partial adder module to receive the increment signal under the control of a phase of a clock signal and cause the highest partial adder module to output its partial sum plus a carry value, wherein the controller having N-1 control circuits, each comprising:

an inverter inverting a carry value from a partial adder module; and

NOR means which has the clock signal and a inverter output signal as two inputs and outputs its NORed signal to a next higher partial adder module.

5. The carry increment adder according to claim 4 wherein the clock signal is a main clock signal used for sequence control in a synchronous system.

6. The carry increment adder according to claim 4 wherein each of the partial add result detectors comprises:
a plurality of exclusive OR gates, each of which receives a bit from each of two input data (a,b) to generate an exclusive ORed signal; and,
an AND gate which receives the exclusive ORed signal from each exclusive OR gate to generate an ANDed signal.

7. The carry increment adder according to claim 6 wherein the increment signal generator consists of the logic, $$INC(N)=PC(N)+\{PSN(N) \cdot PC(N-1)\}+ \ldots +\{PSN(N-1) \cdot PSN(N-2) \ldots PC(N-N)\};$$

wherein N is a natural number, INC is an increment signal, PC is a carry value and PSN is a determination value.

8. The carry increment adder according to claim 7 wherein each of the partial adder modules is a ripple carry adder.

* * * * *

UNITED STATES PATENT AND TRADEMARK OFFICE
CERTIFICATE OF CORRECTION

PATENT : 5,912,833
DATED : June 15, 1999
INVENTOR(S): Jang et al.

It is certified that error appears in the above-identified patent and that said Letters Patent is hereby corrected as shown below:

In column 3, line 65, delete "RCA of [$2^{nd}$]" and insert -- RCA of --.

In column 5, line 32, delete "RCA delay+increment" and insert -- RCA delay + increment --.

Signed and Sealed this

Fifteenth Day of May, 2001

Attest:

NICHOLAS P. GODICI

Attesting Officer        Acting Director of the United States Patent and Trademark Office